3,397,359
APPARATUS FOR MEASURING THE INPUT CHAR-
ACTERISTICS OF FOUR-TERMINAL NETWORKS
INCLUDING A PROGRAMMING MEANS
Lothar Rohde, Munich, Germany, assignor to Rohde &
Schwarz Ohg., Munich, Germany
Filed Feb. 1, 1965, Ser. No. 429,370
Claims priority, application Germany, Feb. 5, 1964,
R 37,127
11 Claims. (Cl. 324—57)

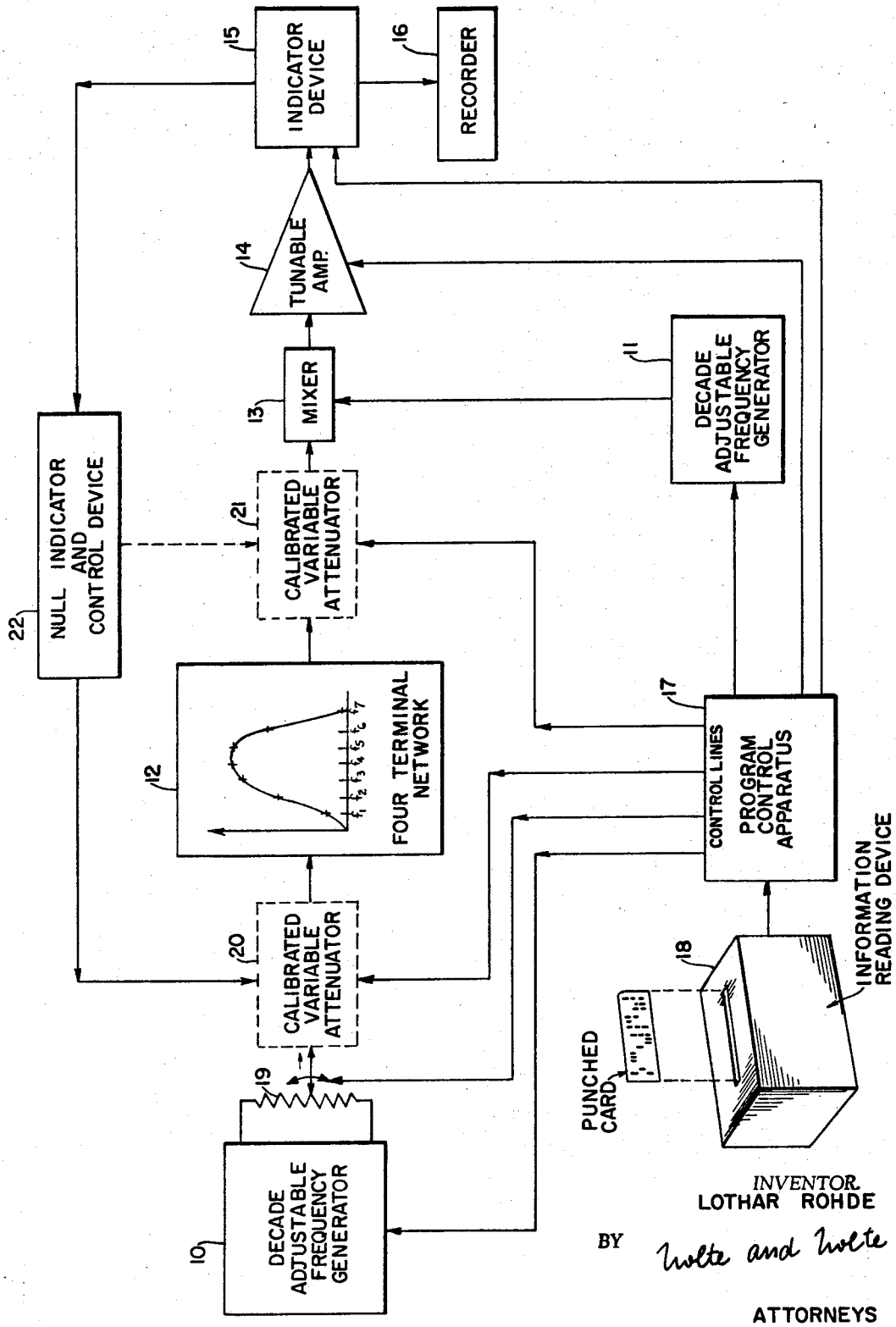

This invention relates to an apparatus for measuring the input characteristics of four terminal networks. More particularly this invention relates to an apparatus for measuring the attenuation and phase shift as a function of the input frequency applied to the network.

Apparatus of this kind known in the prior art generally contain two frequency generators for producing output frequencies which differ with respect to each other by a predetermined fixed frequency difference. One of these generators is usually employed to feed the four terminal network under test while the other is used to convert the test frequency appearing at the output of the network into a fixed difference frequency by means of a mixer arrangement. This frequency difference appearing at the output of the mixer is then amplified, usually by means of a tuned amplifier, and then fed to an indicating or display device. These known apparatus have the disadvantage of being mostly sweep frequency type devices thus making it difficult to adjust the input frequency to a predetermined and accurately set fixed frequency value while simultaneously maintaining the desired constant frequency difference between the two generators. This is particularly disadvantageous for networks having narrow pass bands since it is a necessary requirement that the frequency difference between the two generators be held exactly in step in order to accurately measure the response curve of a filter.

In order to overcome these disadvantages, it is the purpose of this invention to provide a four terminal network measuring apparatus having two frequency generators capable of being switched in decade steps.

It is also an object of this invention to provide a network measuring apparatus having a pair of frequency generators capable of producing output frequencies automatically and in response to a common programming device that is preset to follow a predetermined test point program.

The frequency generators used in the apparatus according to the invention are provided with adjustable decade frequency steps. The generators produce output frequencies that are derived from crystal controlled oscillators of high stability. This allows the generators to be adjusted precisely to any desired frequency. By being adjustable in decades, they may also be controlled by a central programming device. It is thus possible to provide an automatic and precise point-to-point measurement of a four terminal network in relationship to the frequency and collect that measurement on a display or recording apparatus. These features are particularly advantageous in the mass production and testing of networks and filters since the characteristics of these devices can be rapidly compared with predetermined standard values to determine the quality of the network produced.

It is also proposed in accordance with the present invention to control the output power of at least one of the frequency generators by means of the programming device. The programming device will thus be capable of adjusting the amplitude of the difference frequency and/or the size of the bandwidth or amplification factor of a test amplifier connected to the output of the filter under test. In this manner it will be possible for the programming device to automatically select different test points and perform measurements with any given accuracy with respect to the input voltage. Moreover it is also possible for the programming device to provide additional control over the apparatus under test by operating attenuating devices that can be connected ahead of and/or following the four terminal network under test.

It is also proposed according to the invention to connect at the output of the filter measuring apparatus, a null indicator working in conjunction with the adjustable attenuating devices operatively connected to the four terminal network so as to form a control circuit to adjust the gain of the amplifier connected at the output of the four terminal network so that the voltage displayed at the output may be regulated to a predetermined measured value. In this way it is also possible to present to the network a minimum voltage which is just sufficient for indication on the display apparatus, a feature which lends itself to certain inherent advantages in measurement.

The characteristics of the filter network may be measured in various ways. For example, the measured value can be indicated as an analog or digital quantity by means of an appropriate indicating device and/or it can be registered by means of a recording instrument or the like. It is also advantageous during the production testing of four terminal networks that the indicating device be controlled by a programming unit. In this manner it would be possible to program the programming unit in such a manner that for each network tested only the measured values which depart from the desired values by a predetermined amount are indicated or recorded. It is also possible that the departure from the desired value operate an appropriate signaling device so that personnel performing the production testing of the networks can be told that the particular unit under test is faulty. It is also possible to employ any of the above automation steps in any desired variation or combination in the arrangement according to the invention.

The figure shows a block diagram circuit of one embodiment according to my invention.

The four-terminal network measuring device according to the invention as shown in the figure comprises two frequency generators 10 and 11 which have decade steps to provide for adjustment in frequency. The generators 10 and 11 are capable of providing distinct frequency steps or changes since their output frequencies are produced by a known means of frequency analysis or frequency synthesis and can be adjusted with the preciseness of quartz crystal frequencies. The output of generator 10 is connected to the input of the four terminal network 12 under test. The output of network 12 as well as generator 11 are connected to mixer 13. By maintaining a constant frequency difference between generator 10 and generator 11, it is possible to transform the output signal from the four terminal network 12 into a constant difference frequency by the conversion which takes place in mixer 13. The generators 10 and 11 may also be combined into one unit to supply a frequency spectra taken from a common quartz controlling crystal. By providing two generators having decade adjustable steps it is possible to select a broad spectrum of frequencies to meet the requirements of the network under test. It is possible, for example, to select frequencies on the order of from 100 cycles per second, or frequencies in the kilocycle or megacycle range to facilitate testing of the network. The output of mixer 13 is connected to the input of tuned amplifier 14 so that the difference frequency may be amplified prior to being displayed on indicating device 15. Tuned amplifier 14 is a selectively tuned amplifier having individually tuned stages with a bandwidth sufficiently wide to accommodate small changes in the constant difference frequency produced over the operating spectrum of the filter under test and still narrow enough to reject subharmonics or image frequencies produced by the mixer 13. Indicating device 15 shown connected to the output of tuned amplifier 14 may consist of a meter or other measuring device capable of indicating the magnitude of the difference frequency signal produced at the output of the tuned amplifier. Recorder 16 is also shown connected to the output or indicating device 15 to provide a permanent record of the results of the test. Indicating device 15 is also shown connected to programming device 17 and may also be provided with the values of frequency applied to the input of the network under test. This would enable it to provide the recorder 16 with sufficient information to produce a plot or graph showing the magnitude of the output of the filter under test with respect to the applied frequency.

Programming device 17 is also shown connected to generators 10 and 11 and is capable of providing discrete frequency adjustments of both generators. A predetermined test point program may then be fed into the programming device 17 by insertion into the appropriate information reading device 18. The information reading devce 18 may be a punched-card reading apparatus or appropriate electronic, magnetic, optical, or mechanical device for receiving a predetermined code of instructions, converting those instructions into a logic, and applying that logic to the programming device 17 so as to enable it to control generators 10 and 11 during the testing of the network. The programming device can thus for example control generators 10 and 11 in sequence in such a manner that the frequency values $f_1$ to $f_7$ may be introduced sequentially into the four terminal network 12 to enable the recorder to produce the characteristic curve of that network. Moreover it is also possible for the programming apparatus 17 to provide the desired values of output voltage for each of the frequency steps $f_1$ to $f_7$ for the network under test and compare these values with the values received by the indicating device 15 so that the recording apparatus 16 will produce a signal only in response to a predetermined departure of the measured signal from the desired signal produced by the programming apparatus.

Programming apparatus 17 also controls voltage divider 19 connected to the output of frequency generator 10. Voltage divider 19 may be remotely controlled by the programming apparatus so as to adjust the magnitude of the output signal produced by generator 10 and fed into the input of network 12. Thus, it is possible for the programming apparatus 17 to adjust the output voltage of generator 10 for different frequency test points in response to the programming apparatus. It is also within the scope of the invention to provide the same type of control to the output voltage of generator 11.

For various test requirements it may also be advantageous to adjust the degree of amplification and/or the transmitted bandwidth of the tuned amplifier 14 to accommodate different values of frequency corresponding to a program of test points. Programming device 17 is thus also shown connected to tuned amplifier 14.

Programming apparatus 17 is also shown connected to a pair of attenuators 20 and 21 shown in broken lines in the figure. Attenuator 20 may be inserted intermediate of the output of generator 10 and the input of filter 12. Attenuator 21 may be inserted intermediate of the output of network 12 and mixer 13. It is thus possible for programming apparatus to control the amplitude of the output of generator 10 or network 12 by adjusting the attenuator devices 20 or 21 respectively in accordance with the information fed into the programming apparatus 17. Calibrated attenuators according to U.S. application Ser. No. 88,182 are particularly suitable as attenuators for this purpose and can be controlled in accordance with a program by means of an appropriate operating mechanism.

By employing calibrated attenuators 20 and 21 it is possible to test the four terminal network 12 at two different input voltage levels for each test point. It is also possible to test the network 12 at the different voltage levels for each test point by appropriate use of voltage divider 19.

For certain test measurements it is also possible and advantageous to modify the circuit of the figure to employ a null indicator 22 in place of indicating device 15. The null indicator 22 may be connected directly to the output of tuned amplifier 14 or to input of indicating device 15. Null indicator 22 serves as a feedback control circuit for monitoring the output voltage of the network measuring apparatus and provides a command signal responsive to that output to adjust either attenuator 20, attenuator 21, or both so that the magnitude of output voltage will be reduced to a minimum or zero value. The amount of adjustment necessary to reduce the output voltage of the four terminal network to the minimum or zero value is also indicated as a measured quantity on a meter on null indicator 22. By employing this modification of the basic circuit according to the invention, the four terminal network 12 under test thus has the advantage that it can be subjected to the smallest possible input voltage.

Although the present invention has been described in conjunction with a preferred embodiment it is to be understood that modifications and variations may be resorted to without departing from the spirit and scope of the invention, as those skilled in the art will readily understand. Such modifications and variations are considered to be within the purview and scope of the invention and appended claims.

I claim:

1. In combination with an apparatus for testing a four terminal network including a first and second decade tunable frequency generator for producing a first and second output frequency displaced with respect from one another by a predetermined fixed difference frequency, said first frequency being fed into the network under test, a frequency converter connected to the output of the network and the second generator for producing a difference frequency from the difference between the second frequency and the output frequency of the network, an amplifier connected to the converter and selectively tuned to the difference frequency to amplify the difference frequency, and an indicating device connected to the output of the amplifier to indicate the magnitude of the amplified signal, the improvement of which comprises: programming means for storing a predetermined program having a plurality of points indicative of the characteristics of the network, and a means connected to the generators for automatically adjusting the frequencies of the outputs of the first and second generators in response to said predetermined program.

2. The combination as recited in claim 1 wherein said programming means includes an information reading device for converting a test program into a plurality of command signals, and a programming apparatus connected to said reading device and responsive to said command signals for adjusting the output frequencies of the generators for each of the test points.

3. The combination as recited in claim 2 wherein the output power of at least one of the frequency generators is controlled by the programming apparatus.

4. The combination as recited in claim 2 wherein the gain and bandwidth of the selectively tuned amplifier are controlled by the programming apparatus.

5. The combination as recited in claim 2 additionally comprising a first calibrated attenuator operatively connected intermediate of said first generator and said network under test, said first attenuator being controlled by the programming apparatus.

6. The combination as recited in claim 2 additionally comprising a second calibrated attenuator controlled by said programming apparatus and operatively connected intermediate of the frequency converter and the four terminal network.

7. The combination as recited in claim 6 additionally comprising a null indicator connected to the output of the amplifier for producing a command signal to adjust said first calibrated attenuator so as to produce a constant voltage magnitude at the output of the amplifier for each of the test values.

8. The combination according to claim 7 wherein said null indicator additionally comprises a display device for indicating the magnitude of the command signal applied to said first attenuator.

9. The combination as recited in claim 6 additionally comprising a null indicator connected to the output of the amplifier for producing a command signal to adjust said second calibrated attenuator so as to produce a constant voltage magnitude at the output of the amplifier for each of the test values.

10. The combination according to claim 9 wherein said null indicator additionally comprises a display device for indicating the magnitude of the command signal applied to said second attenuator.

11. The combination as recited in claim 2 wherein means are provided for comparing the magnitude of the signal applied to the input of the indicating device with the signal produced by the programming device so that only the difference between the two signals is displayed on the indicating device.

References Cited

UNITED STATES PATENTS

| | | | |
|---|---|---|---|
| 2,767,374 | 10/1956 | Slonczewski | 324—57 |
| 2,931,900 | 4/1960 | Goodman | 324—58 |
| 3,034,051 | 5/1962 | Higgins | 324—73 |

RUDOLPH V. ROLINEC, *Primary Examiner.*

E. E. KUBASIEWICZ, *Assistant Examiner.*